(12) United States Patent
Hunt

(10) Patent No.: US 11,375,658 B2
(45) Date of Patent: Jul. 5, 2022

(54) SYSTEM AND METHOD FOR LEVELING A CUTTER BAR OF A HARVESTER

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 320 days.

(21) Appl. No.: 16/724,872

(22) Filed: Dec. 23, 2019

(65) Prior Publication Data

US 2021/0185878 A1   Jun. 24, 2021

(51) Int. Cl.
*A01D 34/28* (2006.01)
*A01D 41/14* (2006.01)

(52) U.S. Cl.
CPC ......... *A01D 34/283* (2013.01); *A01D 41/141* (2013.01)

(58) Field of Classification Search
CPC ...... A01D 34/24; A01D 34/28; A01D 34/283; A01D 34/246; A01D 34/305; A01D 41/141; A01D 41/14; A01D 41/145; A01D 41/1274
See application file for complete search history.

(56) References Cited

U.S. PATENT DOCUMENTS 4,313,294 A * 2/1982 Martenas ............. A01D 41/145
56/15.8
4,669,256 A * 6/1987 Ermacora ............ A01D 34/246
56/13.6
5,359,836 A   11/1994 Zeuner et al.
(Continued)

FOREIGN PATENT DOCUMENTS

| CA | 3072993 A1 * | 6/2019 | ............. A01B 63/10 |
| EP | 0786200 | 5/2003 | |

(Continued)

OTHER PUBLICATIONS

Extended European Search Report for EP Application No. 20217139.3 dated May 18, 2021 (six pages).
(Continued)

*Primary Examiner* — Adam J Behrens
(74) *Attorney, Agent, or Firm* — Peter Zacharias; Patrick Sheldrake

(57) ABSTRACT

An agricultural system includes an arm that supports a cutter bar assembly and is coupled to a fluid-filled biasing member such that the fluid-filled biasing member imparts a torque onto the arm. The agricultural system further includes an actuator and a controller. The actuator is coupled to the fluid-filled biasing member and is configured to move the fluid-filled biasing member relative to the actuator to change the torque imparted by the fluid-filled biasing member onto the arm. The controller is configured to determine a target position of the arm associated with a leveled configuration of the cutter bar assembly, receive an input to set the cutter bar assembly in the leveled configuration, and output a signal to instruct the actuator to set the fluid-filled biasing member relative to the actuator based on the target position upon receiving the input to set the cutter bar assembly in the leveled configuration.

20 Claims, 7 Drawing Sheets

(56) References Cited

U.S. PATENT DOCUMENTS

| | | | |
|---|---|---|---|
| 5,704,200 A * | 1/1998 | Chmielewski, Jr. | ............................ A01D 41/141 56/10.2 E |
| 6,073,431 A * | 6/2000 | Osborne | ................. A01D 41/16 56/15.7 |
| 6,230,089 B1 | 5/2001 | Lonn et al. | |
| 6,871,483 B1 | 3/2005 | Panoushek | |
| 7,866,133 B2 | 1/2011 | Funk et al. | |
| 7,877,976 B2 * | 2/2011 | Honas | ..................... A01D 57/20 56/208 |
| 7,950,212 B1 | 5/2011 | Figgins et al. | |
| 7,992,374 B1 * | 8/2011 | Bich | ..................... A01D 41/141 56/208 |
| 8,051,633 B2 * | 11/2011 | Figgins | ................. A01D 34/283 56/181 |
| 8,261,521 B2 | 9/2012 | Thompson | |
| 10,299,434 B2 | 5/2019 | Yanke et al. | |
| 10,959,374 B2 * | 3/2021 | Duerksen | ................ A01D 57/20 |
| 2007/0163220 A1 * | 7/2007 | Ehrhart | ................... A01D 75/28 56/10.2 E |
| 2008/0078155 A1 * | 4/2008 | Goers | ................... A01D 41/141 56/15.8 |
| 2010/0083629 A1 * | 4/2010 | Klotzbach | .............. A01D 41/14 56/320.1 |
| 2014/0109536 A1 * | 4/2014 | Boeck | .................... A01D 34/30 56/14.7 |
| 2018/0153102 A1 | 6/2018 | Dunn et al. | |
| 2018/0359920 A1 * | 12/2018 | Dunn | ................... A01B 63/108 |
| 2019/0003496 A1 | 1/2019 | Hunt et al. | |
| 2019/0110397 A1 | 4/2019 | Brimeyer et al. | |
| 2019/0110402 A1 * | 4/2019 | Vandeven | .............. A01D 41/14 |
| 2020/0214204 A1 * | 7/2020 | Karst | ................... A01D 41/145 |

FOREIGN PATENT DOCUMENTS

| | | |
|---|---|---|
| EP | 3427564 | 1/2019 |
| EP | 3427564 A1 | 1/2019 |
| EP | 3473076 | 4/2019 |
| WO | 2018166797 | 9/2018 |
| WO | 2019055521 | 3/2019 |
| WO | 2019111069 A1 | 6/2019 |

OTHER PUBLICATIONS

U.S. Appl. No. 16/724,625, filed Dec. 23, 2019, Cory Douglas Hunt.
U.S. Appl. No. 16/724,892, filed Dec. 23, 2019, Cory Douglas Hunt.

* cited by examiner

SYSTEM AND METHOD FOR LEVELING A CUTTER BAR OF A HARVESTER

BACKGROUND

The present disclosure generally relates to a cutter bar assembly for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes an arm configured to rotate about a pivot joint. The arm is configured to support a portion of a cutter bar assembly, and the arm is coupled to a fluid-filled biasing member such that the fluid-filled biasing member imparts a torque onto the arm. The agricultural system further includes an actuator coupled to the fluid-filled biasing member, in which the actuator is configured to move the fluid-filled biasing member relative to the actuator to change the torque imparted by the fluid-filled biasing member onto the arm. The agricultural system also includes a controller communicatively coupled to the actuator and configured to determine a target leveled base position of the arm associated with a leveled configuration of the cutter bar assembly, receive an input to set the cutter bar assembly in the leveled configuration, and output a signal to instruct the actuator to set the fluid-filled biasing member relative to the actuator based on the target leveled base position in response to receiving the input to set the cutter bar assembly in the leveled configuration.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
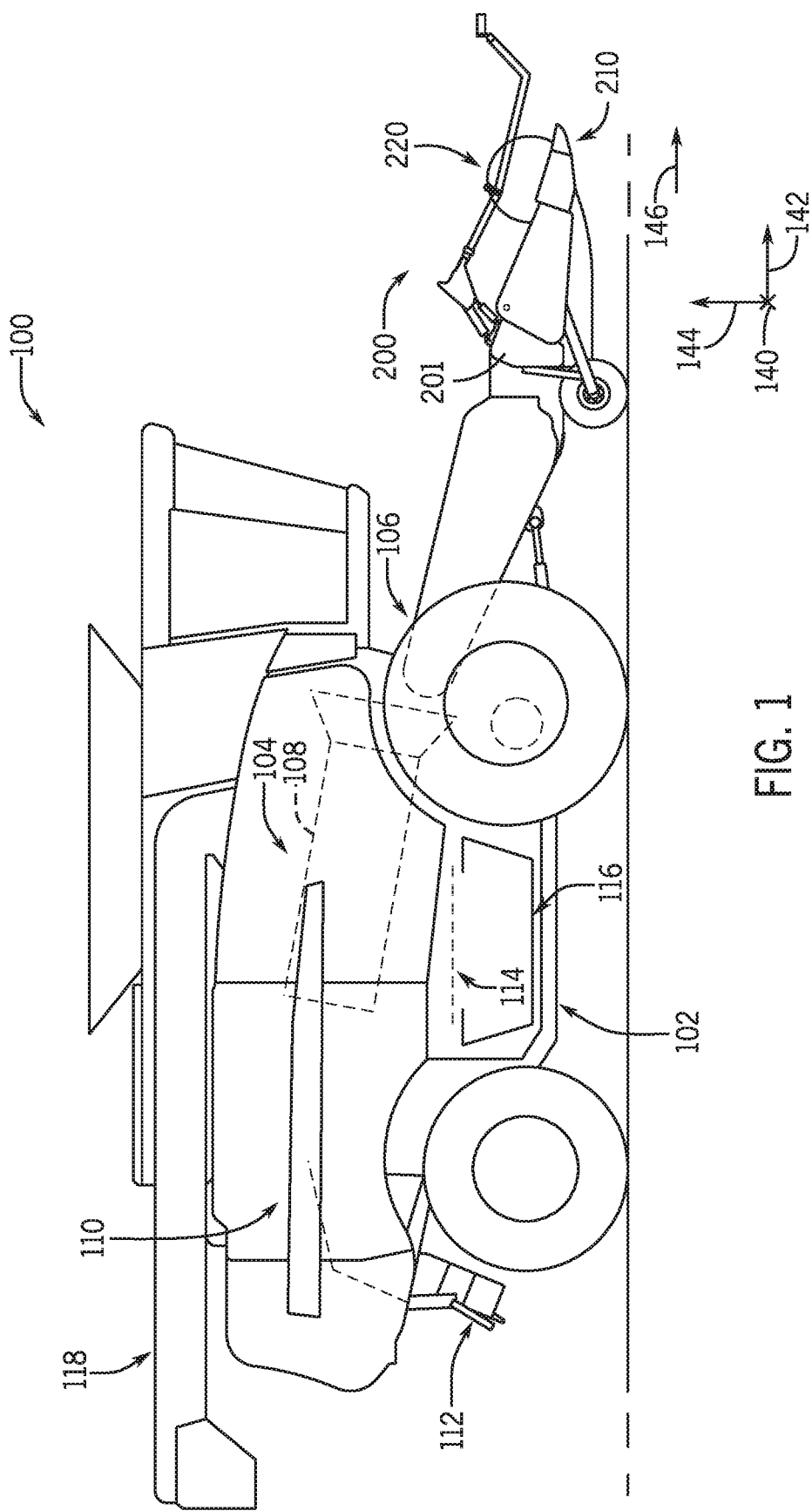
FIG. 1 is a side view of an embodiment of an agricultural system, in accordance with an aspect of the present disclosure.

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header move the crops toward a crop processing system of the harvester. For example, the conveyor on the side draper deck(s) may move the cut crops toward an infeed draper deck at a center of the header. A conveyor on the infeed draper deck may then move the crops toward the processing system. The processing system may include a threshing machine configured to thresh the crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader) by passing through an exit pipe or a spreader to fall down onto the field.

The header may include arms that are coupled to the cutter bar assembly. As the harvester moves over a contoured field and/or performs certain operations, the arms may rotate relative to a header frame about a pivot point or joint to enable the cutter bar assembly to be positioned desirably for cutting the crops. For example, each of the side draper deck(s) and the infeed draper deck may include the arms and linkages that are coupled to pressurized fluid system(s) that include fluid-filled biasing members. Each arm may be connected to a respective fluid-filled biasing member that imparts a force on the cutter bar assembly to support the cutter bar assembly and to set a base position of the arm (e.g., a rotational position about the pivot point). Each fluid-filled biasing member may also enable some movement (e.g., rotation about the pivot point) of the respective arms to deviate slightly from the base position so as to enable the arms to follow a contour of the ground. By way of example, the ground may contact a part of the cutter bar assembly to exert a force onto some of the arms, thereby causing the arms to move from the base position. When the ground no longer contacts the part of the cutter bar assembly, a weight of the cutter bar assembly may cause the arms to move back to the base position and be supported by the respective fluid-filled biasing members.

In some operating modes of the harvester, it may be desirable to level the cutter bar assembly. That is, it may be desirable to set the position of each arm such that the cutter bar assembly is substantially straight or flat across a width of the cutter bar assembly. For instance, a substantially straight cutter bar assembly may facilitate easier transportation of the flexible draper header. However, without the disclosed embodiments, it may be difficult to set the positions of the arms relative to one another to straighten the cutter bar assembly.

Accordingly, embodiments of the present disclosure are directed to a system and a method that facilitate leveling the cutter bar assembly. For instance, the method may include calibrating the cutter bar assembly to determine respective positions of the arms (e.g., about the pivot point) indicative of a leveled profile of the cutter bar assembly. The respective positions may be stored such that, upon receiving an input to level the cutter bar assembly, the arms may be automatically moved to the respective positions. As such, the method may provide various advantages, such as leveling the cutter bar assembly without having to continuously monitor or determine a profile of the cutter bar assembly.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 206 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

Figure 2:
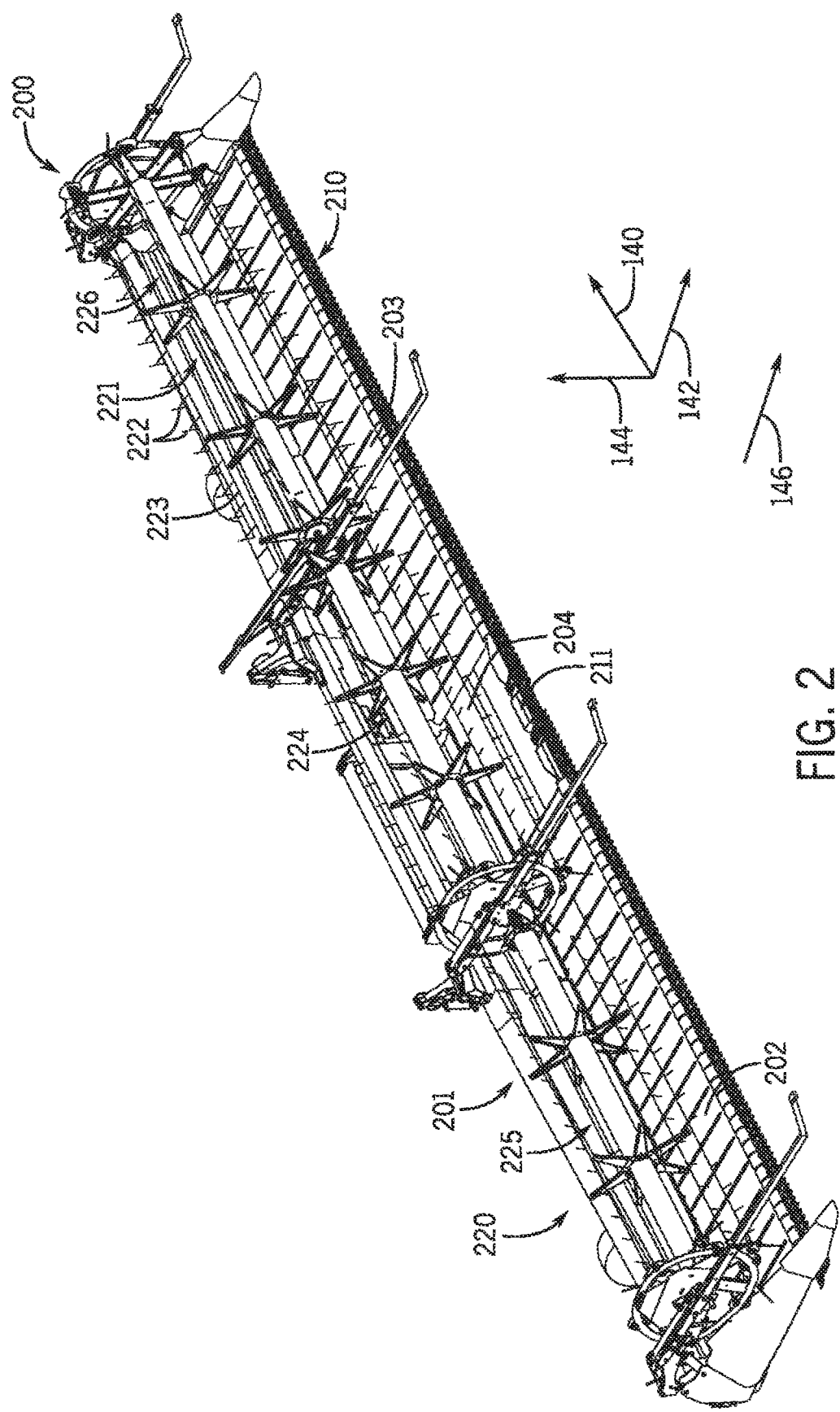
FIG. 2 is a perspective view of an embodiment of a header that may be employed within the agricultural system of FIG. 1, in accordance with an aspect of the present disclosure.

FIG. 2 is a perspective view of an embodiment of the header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of the width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers 222 extending from a central framework 223. The central framework 223 is driven to rotate such that the fingers 222 move (e.g., in a circular pattern). The fingers 222 are configured to engage the crops and urge the cut crops toward the conveyor sections 202, 203 to facilitate transportation of the cut crops to the agricultural crop processing system.

As illustrated herein, the cutter bar assembly 210 is flexible along the width of the header 200. As discussed in detail below, the cutter bar assembly 210 is supported by multiple arm assemblies distributed along the width of the header 200. In some embodiments, the frame 201 of the header 200 may be movably coupled to the chassis of the agricultural system. Each arm assembly is mounted to the frame 201 and includes an arm coupled to the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200. Moreover, certain parts of the header 200 may move relative to one another. For example, the header 200 includes a first section (e.g., center section) 224, a second section 225 extending from a side of the first section 224, and a third section 226 extending from another side of the first section 224. The sections 224, 225, 226 may be movable relative to one another, such as to raise and/or lower the second section 225 and/or the third section 226 relative to the first section 224 in order to enable the cutter bar assembly 210 to follow the contour of the field more acutely.

Figure 3:
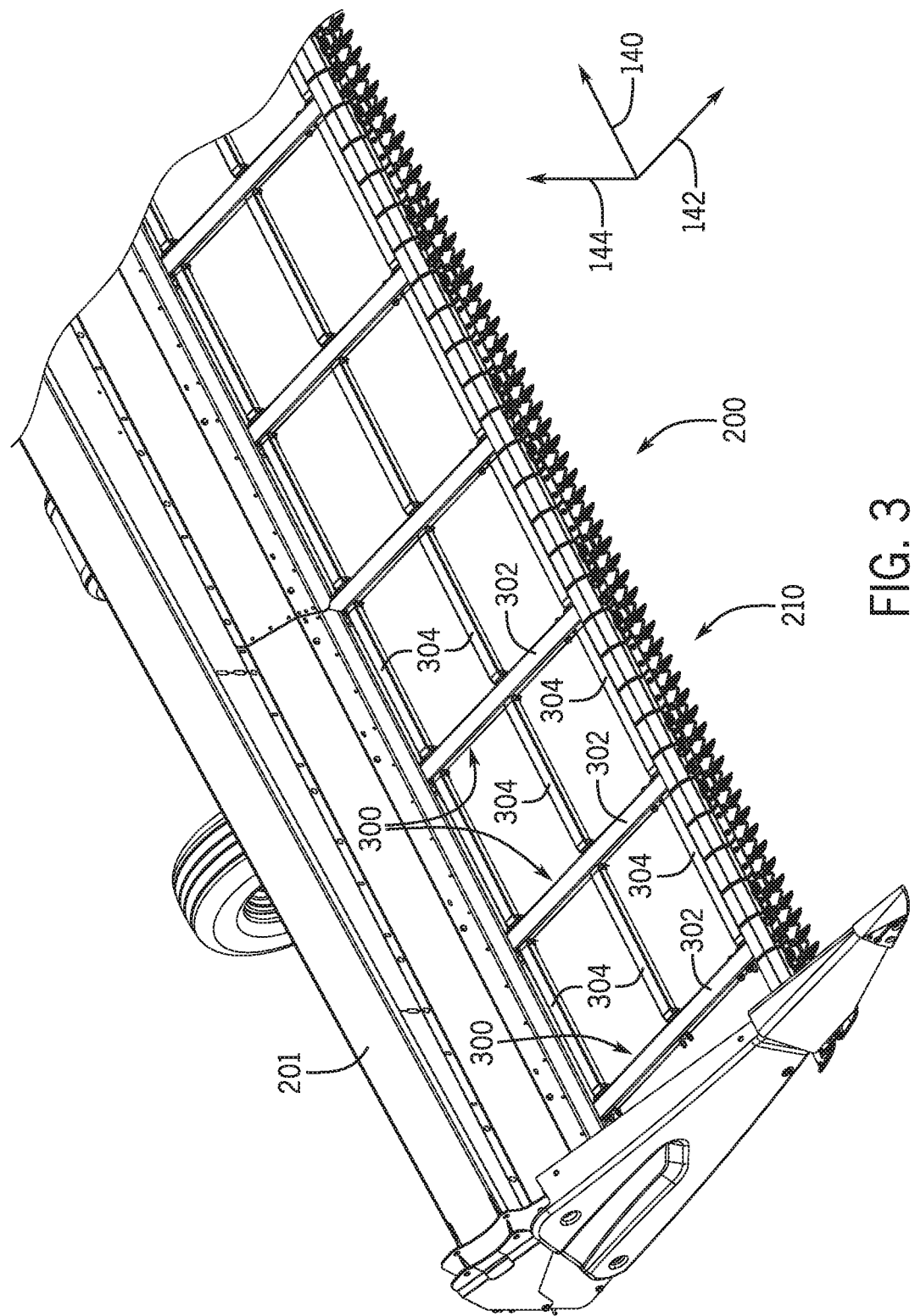
FIG. 3 is a top expanded perspective view of a portion of the header of FIG. 2, in accordance with an aspect of the present disclosure.

FIG. 3 is a perspective view of a portion of the header 200 of FIG. 2, further illustrating the frame 201, the cutter bar assembly 210, and arm assemblies 300 that support the cutter bar assembly 210. As illustrated, each arm assembly 300 includes an arm 302 that extends substantially along the longitudinal axis 142. However, in alternative embodiments, each arm may extend in any suitable direction. In the illustrated embodiment, the arm assemblies 300 are distributed along the width of the header 200. The spacing between the arm assemblies 300 may be selected to enable the arm assemblies 300 to support the cutter bar assembly 210 and to enable the cutter bar assembly 210 to flex during operation of the header 200. As discussed in detail below, each arm 302 is coupled to the frame 201 and to a fluid-filled biasing member and an actuator of the respective arm assembly 300. The fluid-filled biasing member and the actuator enable the arm to rotate and/or move vertically (e.g., along the vertical axis 144) relative to the frame 201, thereby enabling the cutter bar assembly 210, which is supported by the arms 302, to flex in response to variations in the contours of the field. The ability of the cutter bar assembly 210 to flex enables the harvester to precisely cut the crops at a target height, thereby increasing crop yields while harvesting.

In the illustrated embodiment, lateral supports 304 extend between respective pairs of arms 302. A first end of each lateral support 304 is pivotally coupled to one arm 302, and a second end of each lateral support 304 is pivotally coupled to another arm 302. The lateral supports 304 may be configured to support the respective conveyor sections (e.g., extend through a respective opening defined by each conveyor section), while enabling the arms 302 to rotate/move relative to the frame 201. While three lateral supports 304 are positioned between each pair of arms 302 in the illustrated embodiment, in additional or alternative embodiments, more or fewer lateral supports may be positioned between at least one pair of arms. Furthermore, in certain embodiments, the lateral supports may be omitted between at least one pair of arms.

Figure 4:
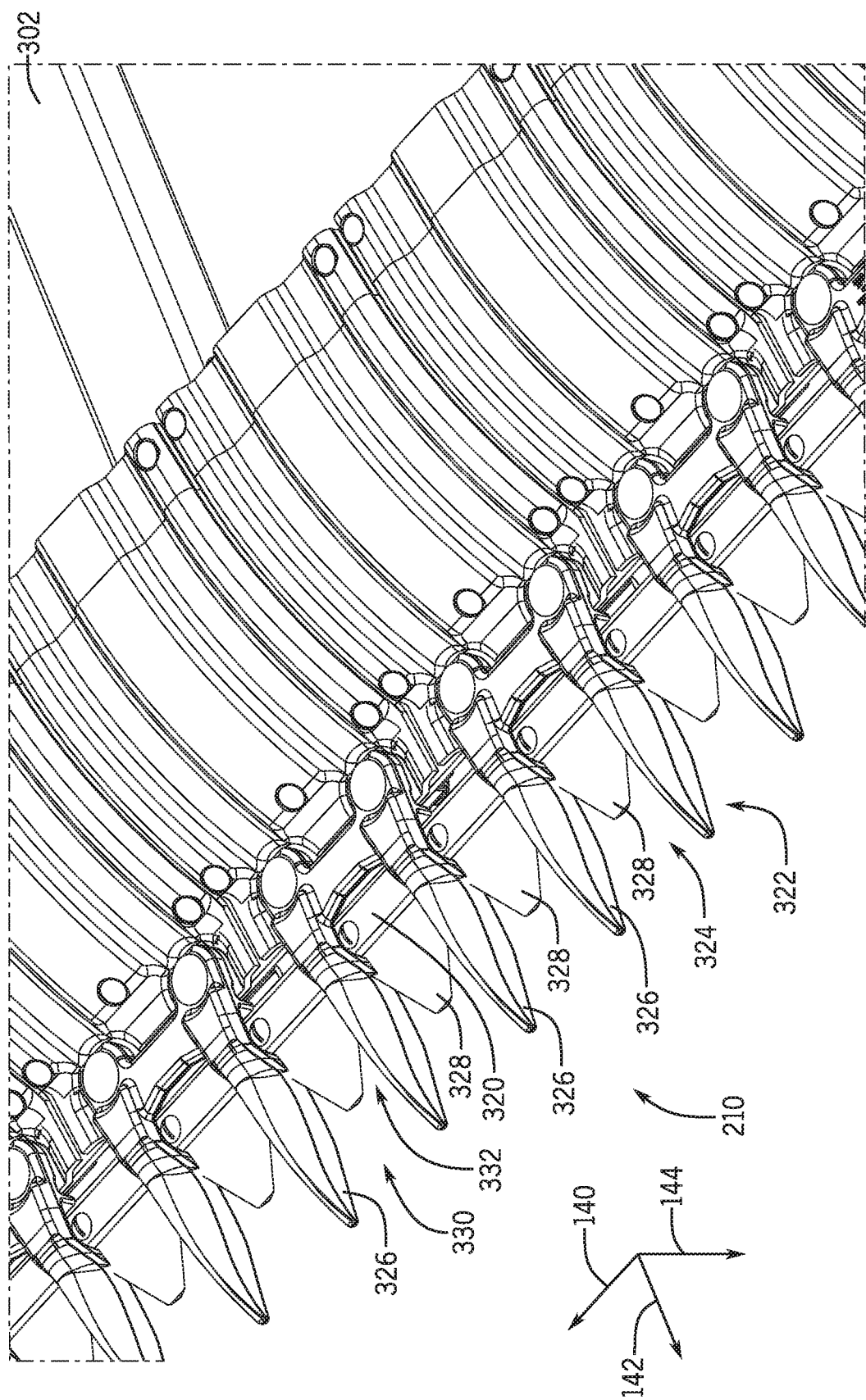
FIG. 4 is an expanded perspective view of an embodiment of an underside of a portion of a cutter bar assembly that may be employed within the header of FIGS. 2 and 3, in accordance with an aspect of the present disclosure.

FIG. 4 is an expanded perspective view of an embodiment of an underside of a portion of the cutter bar assembly 210 that may be employed within the header of FIGS. 2 and 3. As illustrated, the cutter bar assembly 210 includes a blade support 320, a stationary guard assembly 322, and a moving blade assembly 324 coupled to the blade support 320. The moving blade assembly 324 is coupled to the blade support 320. The blade support 320 and the moving blade assembly 324 are driven to oscillate relative to the stationary guard assembly 322. The stationary guard assembly 322 includes multiple stationary guards 326 distributed along the width of the stationary guard assembly 322 (e.g., along the lateral axis 140), and the moving blade assembly 324 includes multiple moving blades 328 distributed along the width of the moving blade assembly 324 (e.g., along the lateral axis 140). As the moving blade assembly 324 is driven to oscillate, the moving blades 328 move relative to the stationary guards 326. When the header is moved through the field by the harvester, a portion of a crop (e.g., the stalk) may enter a gap 330 between adjacent stationary guards 326 and a gap 332 between adjacent moving blades 328. Movement of the moving blade assembly 324 causes one of the moving blade 328 to move across the gap 330 in the stationary guard assembly 322, thereby cutting the portion of the crop.

In the illustrated embodiment, the stationary guard assembly 322 is coupled to one of the arms 302 (e.g., via fasteners). In addition, the blade support 320 and the moving blade assembly 324 are movably coupled to the stationary guard assembly 322 (e.g., the blade support 320 and the moving blade assembly 324 pass through openings in the stationary guards 326). The arms 302 and/or the blade support 320 may be flexible, thereby enabling the cutter bar assembly 210 to flex in response to variations in the soil surface (e.g., while the cutter bar assembly 210 is in contact with the soil surface).

Figure 5:
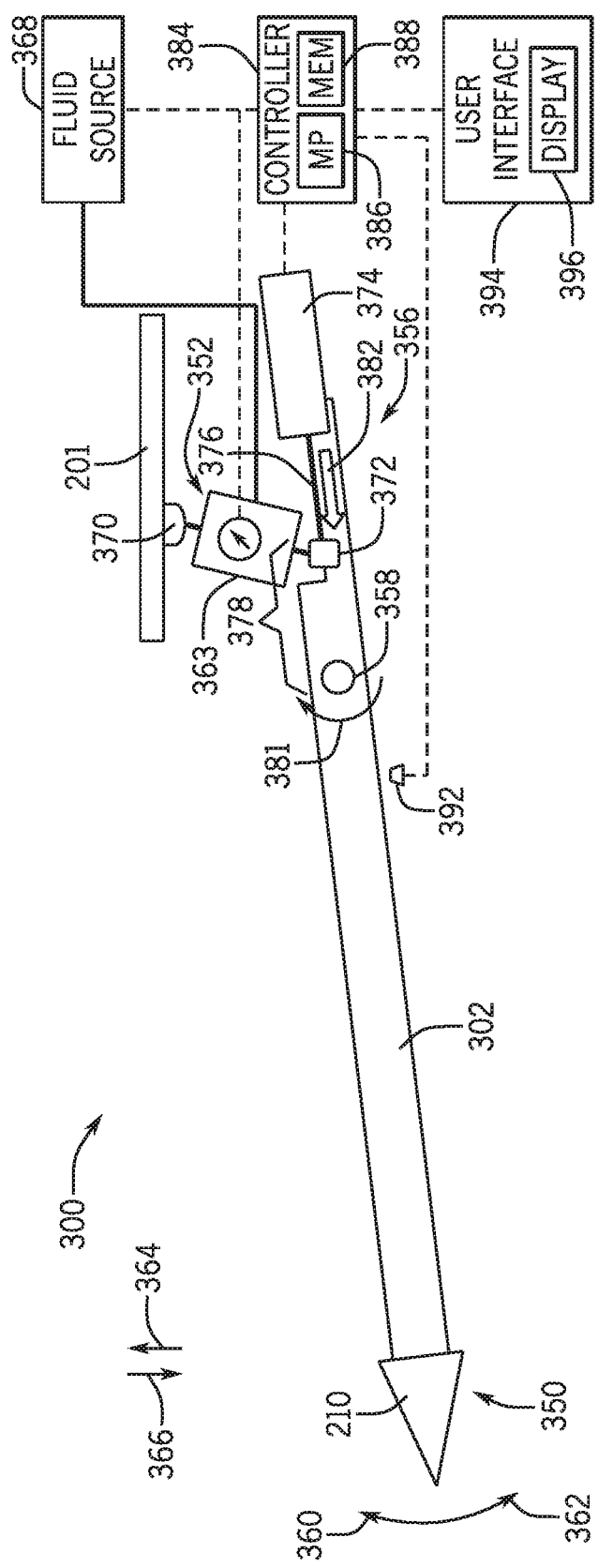
FIG. 5 is a side view of an embodiment of an arm assembly that may be employed within the header of FIGS. 2 and 3, in accordance with an aspect of the present disclosure.

FIG. 5 is a side view of an embodiment of the arm assembly 300 that may be employed within the header 200 of FIGS. 2 and 3. In this example, the arm assembly 300 includes the arm 302 that is configured to support a portion of the cutter bar assembly 210. As illustrated, the arm 302 is coupled to the cutter bar assembly 210 at a first end 350 (e.g., a first end portion) and is coupled to a fluid-filled biasing member 352 and to an actuator 374 at a second end 356 (e.g., a second end portion). The fluid-filled biasing member 352 may impart a force onto the second end 356 of the arm 302 to position the arm 302. For instance, the arm assembly 300 is configured to pivot about a pivot joint 358 (e.g., a pin), thereby rotating relative to the frame 201 of the header. In this manner, the portion of the cutter bar assembly 210 coupled to the arm 302 may move in a first direction 360 and/or in a second direction 362 relative to the frame 201. Further, the fluid-filled biasing member 352 may include a flexible container 363 (e.g., an air bag) configured to hold an amount of fluid (e.g., air) to substantially maintain a base position of the arm 302. As used herein, the base position of the arm 302 refers to a position of the arm 302 about the pivot joint 358 when no force (e.g., an external force, such as due to contact with the ground and/or contact with an obstacle) is exerted onto the cutter bar assembly 210 at the first end 350.

During operation of the agricultural system, the position of the arm 302 about the pivot joint 358 may deviate from the base position. For example, the fluid pressurizes the container 363 of the fluid-filled biasing member 352 to at least partially inflate the container 363. As the agricultural system moves over the crop field during operation, the crop field may exert a force in an upward direction 364 onto the cutter bar assembly 210 near the first end 350 of the arm 302, thereby causing the second end 356 of the arm 302 to impart a force in a downward direction 366 onto the container 363. The force imparted in the downward direction 366 onto the container may expand the container 363, thereby enabling the cutter bar assembly 210 to move in the first direction 360. However, when the crop field no longer exerts a force onto the cutter bar assembly 210 (e.g., the header is raised), a weight of the cutter bar assembly 210 exerts a force in the downward direction 366 at the first end 350 of the arm 302 and causes the second end 356 of the arm 302 to impart a force in the upward direction 364 onto the container 363. The force in the upward direction 364 may compress the container 363, thereby enabling the cutter bar assembly 210 to move in the second direction 362. Movement of the cutter bar assembly 210 in the second direction 362 may move the cutter bar assembly 210 toward the crop field, such as to remain in contact with the crop field. In this way, the fluid-filled biasing members 352 may cause the arm 302 to float and move in response to various forces imparted onto the cutter bar assembly 210. Accordingly, the fluid-filled biasing member 352 may enable the cutter bar assembly 210 to move in the directions 360, 362 to follow the contour of the crop field.

Furthermore, the base position of the arms 302 may cause a particular contact force or pressure to be exerted by the cutter bar assembly 210 onto the crop field. By way of example, adjusting the base position of the arm 302 to lower the first end 350 of the arm 302 while the position of the header (e.g., relative to the crop field) is maintained may increase a contact force or pressure between the portion of the cutter bar assembly 210 coupled to the arm 302 and the crop field. Similarly, adjusting the base position of the arm 302 to raise the first end 350 of the arm 302 while the position of the header (e.g., relative to the crop field) is maintained may increase the contact force or pressure between the portion of the cutter bar assembly 210 coupled to the arm 302 and the crop field.

The fluid within the container 363 may produce a fluid pressure that maintains a shape of the container 363, thereby maintaining a rigidity or stiffness of the container 353 to block movement of the cutter bar assembly 210 in the first and second directions 360, 362. For example, increasing the fluid pressure within the container 353 may increase the inflation of the container 363, thereby increasing an amount of force that may have to be imparted to deform the container 363. As such, increasing the fluid pressure within the container 363 increases the stiffness of the fluid-filled biasing member 352 and increases a resistance of the arm 302 to rotate as a result of forces imparted onto the arm 302. In some embodiments, the fluid pressure within the container 363 may be increased above a threshold fluid pressure to operate the header in a rigid mode, in which the stiffness of the fluid-filled biasing members 352 is increased to block substantial movement of the respective arms while the header engages the crop field. By way of example, the rigid mode may be operated to cut crops without following the contour of the crop field (e.g., when the header is at a raised position relative to the crop field). Furthermore, reducing the fluid pressure within the container 363 may reduce the inflation of the container 363, thereby reducing the amount of force that may have to be imparted to deform the container 363. Thus, reducing the fluid pressure within the container 363 reduces the stiffness of the fluid-filled biasing member 352 and reduces the resistance of the arm 302 to rotate as a result of forces imparted onto the arm 302. For instance, reducing the fluid pressure within the container 363 below another fluid pressure threshold may enable the header to operate in a flex mode, in which the stiffness of the fluid-filled biasing member 352 is reduced to enable the arms to move substantially from the base position to follow the contour of the crop field.

The fluid pressure of the container 363 may also cause the fluid-filled biasing member 352 to impart a force onto the second end 356 of the arm 302. By way of example, increasing the amount of fluid pressure in the container 363 may inflate and expand the container 363 to increase a force exerted in the downward direction 366 at the second end 356. The increased force exerted in the downward direction 366 at the second end 356 may move the base position of the arm 302 in the first direction 360. In addition, reducing the amount of fluid pressure in the container 363 may enable the container 363 to deflate to reduce the force exerted in the downward direction 366 at the second end 356. The reduced force exerted in the downward direction 366 at the second end 356 may cause the weight of the cutter bar assembly 210 to move the base position of the arm 302 in the second direction 362.

In order to enable the fluid pressure within the container 363 to be adjusted, the container 363 may be fluidly coupled to a fluid source 368, which may be an air blower, for example. The fluid source 368 may be configured to supply fluid to the container 363, thereby increasing the fluid pressure within the container 363, or to receive fluid directed out of the container 363, thereby reducing the fluid pressure within the container 363. Accordingly, the fluid source 368 may be controlled so as to set the fluid pressure within the container 363 for achieving a desirable stiffness of the fluid-filled biasing member 352 and/or for achieving a desirable base position of the arm 302 (e.g., by controlling an actuator that controls a valve that adjusts a flow of the fluid between the fluid source 368 and one of the container 353 and/or maintains an amount of fluid within the container 353).

A connection point between the fluid-filled biasing member 352 and the arm 302 may also be adjustable for setting the desirable base position of the arm 302 (e.g., more quickly compared to adjusting the fluid pressure within the container 363 via the fluid source 368). In the illustrated embodiment, a first support 370 may be fixedly coupled to the frame 201 such that a position of the first support 370 relative to the frame 201 does not substantially change. A second support 372 of the fluid-filled biasing member 352 may be coupled (e.g., slidingly coupled) to the arm 302, and the second support 372 may be configured to translate along the arm 302. By way of example, the second support 372 may be fixedly coupled to a carriage or bearing configured to slide along the arm 302 so as to translate the second support 372 along the arm 302. In certain embodiments, the second support 372 may be moved by an actuator 374, such as a hydraulic, pneumatic, or electromechanical actuator, of the arm assembly 300. For instance, the actuator 374 may have a rod 376 that is coupled to the second support 372 of the fluid-filled biasing member 352. The actuator 374 may linearly extend and retract the rod 376, thereby moving the second support 372 linearly along the arm 302.

By way of example, the actuator 374 may position the second support 372 at a first distance 378 away from the pivot joint 358. Accordingly, the fluid-filled biasing member 352 may exert a force in the downward direction 366 onto the arm 302 at a point located at the first distance 378 away from the pivot joint 358. This force exerted by the fluid-filled biasing member 352 may impart a first torque (e.g., in a rotational direction 381 about the pivot joint 358) to set the base position of the arm 302. The actuator 374 may move the second support 372 relative to the pivot joint 358 to change the base position of the arm 302. For instance, extending the rod 376 to move the second support 372 in a first translational direction 382 to move the second support 372 toward the pivot joint 358 may reduce the distance between the pivot joint 358 and the second support 372. As such, the force caused by the fluid-filled biasing member 352 may be exerted at a point more proximate to the pivot joint 358 as compared to the illustrated embodiment, thereby reducing the torque imparted by the fluid-filled biasing member 352 onto the arm 302 in the rotational direction 381. Such a reduced torque may cause the base position of the arm 302 to be lowered in the second direction 362. However, retracting the rod 376 to move the second support 372 away from the pivot joint 358, thereby increasing the distance between the pivot joint 358 and the second support 372, causes the fluid-filled biasing member 352 to exert the force at a point more distal to the pivot joint 358 as compared to the illustrated embodiment. Therefore, the torque imparted by the fluid-filled biasing member 352 onto the arm 302 is increased to raise the base position of the arm 302 in the first direction 360.

Although the illustrated example shows that the actuator 374 moves the second support 372 to raise the base position of the arm 302 in the first direction 360, and the actuator 374 moves the second support 372 to lower the base position of the arm 302 in the second direction 362, the actuator 374 may move the fluid-filled biasing member 352 relative to the actuator 374 in any suitable manner to change the base position of the arm 302. As an example, in additional or alternative embodiments, the actuator may be configured to move the first support (e.g., relative to the frame), rather than the second support, in order to change the base position of the arm. Indeed, the actuator may be configured to move any portion of the fluid-filled biasing member relative to the actuator to change the torque imparted by the fluid-filled biasing member onto the arm, thereby setting the base position of the arm accordingly.

In some embodiments, the agricultural system includes a controller 384 (e.g., electronic controller) configured to control operating parameters of the agricultural system, such as of the arm assembly 300. The controller 384 may include a microprocessor 386 and a memory 388. The memory 388 may be a mass storage device, a flash memory device, removable memory, or any other non-transitory computer-readable medium that contains instructions regarding control of the arm assemblies 300. The memory 388 may also include volatile memory such as randomly accessible memory (RAM) and/or non-volatile memory such as hard disc memory, flash memory, and/or other suitable memory formats. The microprocessor 386 may be configured to execute the instructions stored in the memory 388 to control the arm assembly 300. For instance, the controller 384 may be communicatively coupled to the fluid source 368 to adjust the fluid pressure in the containers 363.

Furthermore, the controller 384 may be communicatively coupled to the actuator 374 to instruct the actuator 374 to move the rods 376, thereby changing the position of the second support 372 with respect to the pivot joint 358. The controller 384 may also be communicatively coupled to a position sensor 392 configured to detect a position of the arm assembly 300, such as an amount or degree of rotation of the arm 302 about the pivot joint 358, a distance between the arm 302 and the crop field, another suitable reading, or any combination thereof. The position sensor 392 may transmit sensor feedback indicative of the detected position (e.g., the detected base position), and the controller 384 may output a signal (e.g., a control signal) to the actuator 374 to set a position of the rod 376 accordingly to establish the base position of the arm 302. Additionally or alternatively, the position sensor may be configured to detect a position of the second support (e.g., relative to the pivot joint), and the controller may be configured to set the position of the second support based on a current position of the second support detected by the position sensor, thereby setting the base position of the arm.

In some embodiments, the position sensor 392 may be a contact sensor configured to detect position based on contact with a component of the agricultural system. For example, the position sensor 392 may bend or flex as the arm 302 rotates about the pivot joint 358 and/or as the second support 372 moves via the actuator 374, and the amount of bending of the position sensor 392 may be used to determine the position of the arm 302 and/or of the second support 372. To this end, the position sensor 392 may be located on the arm 302, such as adjacent to the pivot joint 358 and/or adjacent to the second support 372. In additional or alternative embodiments, the position sensor 392 may be a non-contact sensor configured to detect position without relying on a contact with a component of the agricultural system. As an example, the position sensor 392 may detect a distance spanning between a portion of the arm 302 and the frame 201 and/or a distance spanning between the second support 372 and another portion of the arm 302 to determine the position of the arm 302 and/or of the second support 372, respectively. Indeed, any suitable position sensor 392 may be utilized by the arm assembly 300, including a flex sensor, a force sensor, a proximity sensor, a rotary sensor, and so forth.

The agricultural system may further include a user interface 394 that a user, such as an operator of the agricultural system, may use to set the position of the arm assembly 300. For example, the user may utilize the user interface 394 to input a target fluid pressure of the container 363, a target base position of the arm 302, a target position of the second support 312, another suitable operating parameter, or any combination thereof. Based on the received input, the controller 384 may control the arm assembly 300 accordingly, such as by outputting a signal to instruct the fluid source 368 to change the fluid pressure in the container 363, by outputting a signal to instruct the actuator 374 to move the rod 376, by performing another suitable operation, or any combination thereof, to match the operating parameter of the arm assembly 300 with the target operating parameter input by the user.

In some embodiments, the user interface 394 may include a display 396 that may indicate a certain operating parameter of the agricultural system (e.g., of the arm assembly 300), and the user may utilize the display 396 to set the target operating parameter of the arm assembly 300. For instance, the display 396 may include a touchscreen. In additional or alternative embodiments, the user interface may include a different feature, such as a joystick, a button, a dial, a trackpad, a switch, a keyboard, a mouse, a slider, another suitable features, or any combination thereof, to enable the user to set the operating parameters of the arm assembly.

In additional or alternative embodiments, the controller may control the arm assembly automatically (e.g., without input from the user). For instance, the controller may set the base position of the arm and/or the fluid pressure in the container based on a field condition (e.g., a detected field contour), a type of crop being harvested, a time of operation, an operating mode, another operating parameter of the arm assembly and/or of another component of the agricultural system, or any combination thereof. As such, the controller may automatically set the base position of the arm to facilitate harvesting the crop field. In any case, the controller may set the base position of the arm and the fluid pressure simultaneously or sequentially (e.g., set the fluid pressure first and then the base position of the arm based on the set fluid pressure) in order to enable the arm assembly 300 to operate effectively.

Figure 6:
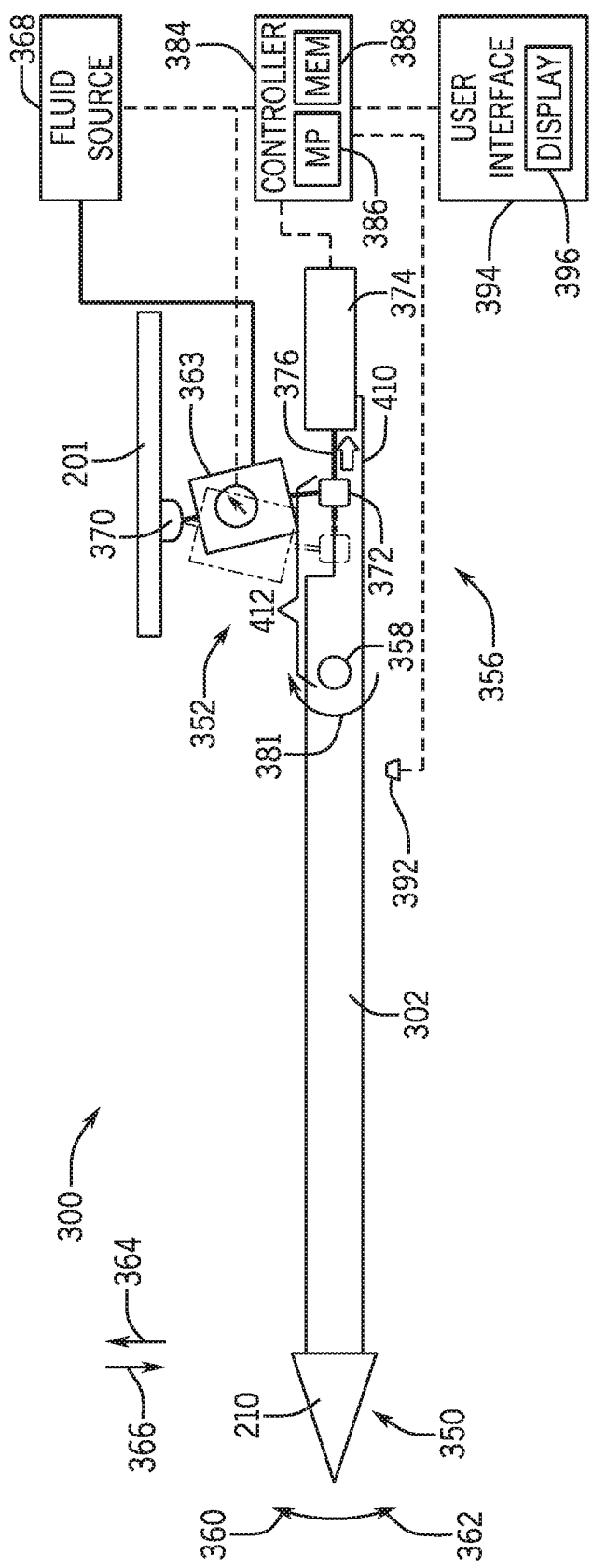
FIG. 6 is a side view of the arm assembly of FIG. 5 including an arm set in another base position, in accordance with an aspect of the present disclosure.

FIG. 6 is a side view of the arm assembly 300 of FIG. 5 including the arm 302 set in another base position. For instance, the illustrated base position may be established by moving (e.g., retracting) the rod 376 from the configuration illustrated in FIG. 5 in a second translational direction 410 opposite the first translational direction 382 of FIG. 5 in order to move the second support 372 away from the pivot joint 358. As a result, the second support 372 may be positioned at a second distance 412 away from the pivot joint 358, in which the second distance 412 is greater than the first distance 378. As described above, increasing the distance between the second support 372 and the pivot joint 358 may increase the torque exerted onto the arm 302 by the fluid-filled biasing member 352. In this manner, the base position of the arm 302 in FIG. 6 may be rotated in the first direction 360 to a greater extent than that of the arm 302 in FIG. 5. Indeed, the particular position of the second support 372 relative to the pivot joint 358 may be controlled based on a desired or target base position in which the arm 302 is to be set.

Although FIGS. 5 and 6 illustrate the controller 384 as communicatively coupled to a single arm assembly 300, the controller may be communicatively coupled to any suitable number of arm assemblies, such as two arm assemblies, three arm assemblies, or four or more arm assemblies. Furthermore, in some embodiments, the containers of multiple arm assemblies may be fluidly coupled to the same fluid source, thereby reducing a cost associated with installing multiple fluid sources onto the agricultural system, for example. That is, the fluid source may be fluidly coupled to more than one container, and each container is mechanically coupled to one or more arms. Thus, one fluid source may be configured to provide substantially the same amount of fluid to each container to which the fluid source is fluidly coupled. In this way, the fluid source may pressurize each container to which the fluid source is fluidly coupled to have substantially the same fluid pressure so as to exert substantially the same force onto the second end of each arm. Advantageously, each actuator may move the corresponding rods independently of the fluid pressure in the container to adjust the base position of each arm without having to change the respective fluid pressures in each container. Further, the actuator of each arm assembly may be independently controllable relative to one another. That is, the actuator of each arm may move a corresponding rod independently of other actuators to set the respective positions of the second supports independently of one another. Accordingly, the base position of each arm may be different (e.g., by changing the torque imparted onto the arms) even though each fluid-filled biasing member is exerting the same force onto the corresponding arm.

In some circumstances, it may be desirable to set the cutter bar assembly in a leveled configuration. In the leveled configuration, the base position of each arm may be set to create a substantially straight appearance of the cutter bar assembly (e.g., a central axis of the cutter bar assembly is substantially parallel to the lateral axis of the header across the width of the cutter bar assembly, substantially parallel to a surface on which the header or the agricultural system is positioned, substantially level or straight when visualized from a position forward of the header, and the like). For instance, the leveled configuration of the cutter bar assembly may be desirable when transporting the header and/or for operating the header in the rigid mode. However, it may be difficult to determine the base position of each arm representing the leveled configuration (e.g., that achieves the leveled configuration) because the cutter bar assembly may have portions of different weights, for instance. In particular, it may be difficult to determine a current base position of each arm and to compare the current base positions of the arms with one another in order to determine whether each arm assembly is currently aligned with one another. For this reason, it is desirable to determine (e.g., calibrate) positions of the second support (e.g., relative to the respective pivot joints) that represent the leveled configuration of the cutter bar assembly, such that the determined positions may be used as reference for setting the base positions of the arms when the leveled configuration is initiated (e.g., upon user input, upon entering a transport or storage mode).

Figure 7:
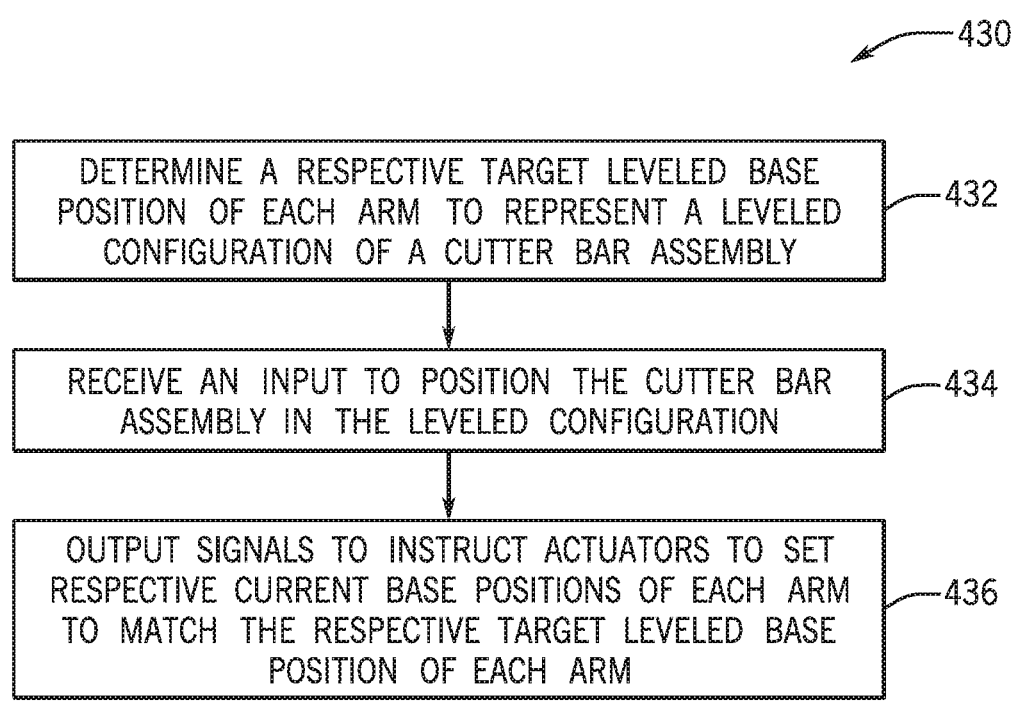
FIG. 7 is an embodiment of a method for setting a cutter bar assembly in a leveled configuration, in accordance with an aspect of the present disclosure.

With this in mind, FIG. 7 is an embodiment of a method 430 for setting the cutter bar assembly in the leveled configuration. The steps of the method 430 may be performed by a controller, such as the controller 384 of FIGS. 3-6. It should be noted that a method that is different than the method depicted in FIG. 7 may be performed for setting the cutter bar assembly in the leveled configuration. For instance, additional steps may be performed and/or certain steps of the method 430 may be removed, modified, and/or performed in a different order.

At block 432, a determination regarding a respective target leveled base position of each arm is made. Each target leveled base position represents a base position of a corresponding arm in the leveled configuration of the cutter bar assembly. In some embodiments, the cutter bar assembly may undergo a leveling calibration to simulate the leveled configuration. For instance, the leveling calibration may include placing the cutter bar assembly against a substantially straight or flat surface, such as against flat ground, while the cutter bar assembly is not in operation. By placing the cutter bar assembly against the substantially straight surface, the arms of the cutter bar assembly may move to align with the substantially straight surface, thereby moving to respective positions that generally align with one another. That is, such respective positions may align the arms to be substantially level with one another to represent the leveled configuration of the cutter bar assembly. These respective positions (e.g., detected by the position sensors) may be stored as the target leveled base positions of the arms, and the target leveled base positions are readily available for reference (e.g., when initializing the leveled configuration).

In some embodiments, the step described at block 432 may be performed at various frequencies or times (e.g., periodically, after certain events). As an example, the calibration for determining the target leveled base position may be performed before each operation of the agricultural system, at a particular time of the year (e.g., at the start of every calendar season), when a structural change of the header is made or detected (e.g., maintenance of one of the arms is performed), and/or at any other suitable time to account for possible factors that may affect a previously stored set of target level base positions. Thus, each updated set of target leveled base positions may replace a previously stored set of target leveled base positions to be available for reference.

At block 434, an input to position the cutter bar assembly in the leveled configuration is received. In certain embodiments, the input may be a user input, which may be received via the user interface. As such, the operator may manually select that the cutter bar assembly is to be positioned in the leveled configuration. In additional or alternative embodiments, the input to position the cutter bar assembly may be received automatically. By way of example, the cutter bar assembly may be configured to be positioned in the leveled configuration at a particular time or location during the operation of the agricultural system (e.g., for an agricultural system configured to operate a pre-programmed path) and/or the cutter bar assembly may be positioned in the leveled configuration based on certain received sensor feedback (e.g., a speed of travel, parked).

In response to receiving the input to position the cutter bar assembly in the leveled configuration, signals may be output, as shown at block 436. The signals may instruct the actuators to set the position of each arm (e.g., by positioning the second supports relative to the respective pivot joints) to match a respective current base position of each arm with the corresponding target leveled base position of each arm as determined in the step described at block 432. As an example, each target leveled base position may include a position reading detected by a respective position sensor during the leveling calibration. Thus, rather than comparing and matching the respective base positions of the arms relative to one another to attempt achieve the leveled configuration, the base positions of the arms are compared and matched with the respective position readings determined during the leveling calibration.

It should be noted that comparing and matching the base positions of the arms with the position readings determined during the leveling calibration may account for various factors (e.g., weight imparted onto each arm) that may affect the amount of torque that has to be applied to each arm to achieve the respective target leveled base positions. As an example, the weight of the portion of the cutter bar assembly supported by each arm may vary based on the location of the arm along the header. Thus, the amount of torque to be applied to each arm (e.g., by moving the second supports to change where the fluid-filled biasing members impart the forces onto the arms) to rotate the arms to the respective target leveled base positions may also vary based on the location of the arm along the header. Accordingly, the output signals may instruct each actuator to set the corresponding second supports at different positions relative to the respective pivot joints so as to apply the amount of torque for achieving the corresponding target leveled base positions. Furthermore, if the weight supported by one of the arms changes (e.g., caused by debris accumulating on the arm) to change the amount of torque to be applied for achieving the target leveled base position, the actuator may be configured to adjust the position of the second support relative to the pivot joint accordingly to achieve the target leveled base position, thereby maintaining the leveled configuration.

In certain embodiments, at least one of the arm assemblies may not have the position sensor configured to determine a current base position of the arm (e.g., only every other arm assembly may have a position sensor). Thus, the arm of the arm assembly may not have an associated position reading. However, based on the location of the arm assembly along the header, a position to which the second support is to be set with respect to the pivot joint may be determined. For instance, the position of the second support with respect to the pivot joint may be based on respective positions to which actuators of adjacent arm assemblies have set respective second supports relative to the corresponding pivot joints (e.g., by calculating a mathematical mean of the positions of the second supports with respect to the pivot joints for the adjacent arm assemblies). In this manner, the leveled base positions for arm assemblies that do not have a dedicated position sensor may still be achieved.

In further embodiments, in addition to or as an alternative to using readings detected by the position sensors during the leveling calibration, readings associated with target positions of the actuators (e.g., of the position of the second support relative to the pivot joint) may be determined during the leveling calibration. Thus, the signals may be output to set the position of the actuators to match the target positions to achieve the leveled configuration of the cutter bar assembly.

While only certain features of the disclosure have been illustrated and described herein, many modifications and changes will occur to those skilled in the art. It is, therefore, to be noted that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
an arm configured to rotate about a pivot joint, wherein the arm is configured to support a portion of a cutter bar assembly, and the arm is coupled to a fluid-filled biasing member such that the fluid-filled biasing member imparts a torque onto the arm;
an actuator coupled to the fluid-filled biasing member, wherein the actuator is configured to move the fluid-filled biasing member along the arm relative to the actuator to change the torque imparted by the fluid-filled biasing member onto the arm; and
a controller communicatively coupled to the actuator and configured to:
determine a target leveled base position of the arm associated with a leveled configuration of the cutter bar assembly;
receive an input to set the cutter bar assembly in the leveled configuration; and
output a signal to instruct the actuator to set the fluid-filled biasing member relative to the actuator based on the target leveled base position in response to receiving the input to set the cutter bar assembly in the leveled configuration.

2. The agricultural system of claim 1, wherein the controller is configured to output the signal to instruct the actuator to set the fluid-filled biasing member relative to the actuator to match a current base position of the arm with the target leveled base position of the arm.

3. The agricultural system of claim 2, wherein the actuator is configured to move a portion of the fluid-filled biasing member away from the actuator to lower the current base position of the arm about the pivot joint, and the actuator is configured to move the portion of the fluid-filled biasing member toward the actuator to raise the current base position of the arm about the pivot joint.

4. The agricultural system of claim 1, comprising a position sensor configured to determine a position of the arm, wherein the target leveled base position is associated with a particular position of the arm detected by the position sensor during a leveling calibration of the cutter bar assembly.

5. The agricultural system of claim 1, wherein the fluid-filled biasing member comprises a container configured to receive fluid from a fluid source fluidly coupled to the fluid-filled biasing member.

6. The agricultural system of claim 5, comprising the fluid source fluidly coupled to the fluid-filled biasing member, wherein the controller is configured to output an additional signal to cause the fluid source to supply fluid into the container, to receive fluid from the container, or both.

7. The agricultural system of claim 1, wherein the fluid-filled biasing member is configured to couple to a frame of the agricultural system, and the controller is configured to output the signal to instruct the actuator to set the fluid-filled biasing member relative to the actuator to set a current base position of the arm relative to the frame.

8. A non-transitory computer readable medium comprising executable instructions that, when executed by a processor, are configured to cause the processor to:
determine a target leveled base position of an arm of a header of an agricultural system, wherein the arm is coupled to a support of a fluid-filled biasing member of the header, the fluid-filled biasing member is configured to impart a torque onto the arm, the target leveled base position is indicative of a rotational position of the arm about a pivot joint, the target leveled base position is associated with a leveled configuration of a cutter bar assembly of the header, and the support of the fluid-filled biasing member is coupled to an actuator configured to move the support along the arm relative to the pivot joint;
receive an input to set the cutter bar assembly of the header in the leveled configuration, wherein the cutter bar assembly is supported by the arm; and
output a control signal to instruct the actuator to set the support relative to the pivot joint based on the target leveled base position in response to receiving the input to set the cutter bar assembly in the leveled configuration.

9. The non-transitory computer readable medium of claim 8, wherein the instructions, when executed by the processor, are configured to cause the processor to:
determine a detected position of the arm during a leveling calibration of the cutter bar assembly; and
store the detected position of the arm as the target leveled base position.

10. The non-transitory computer readable medium of claim 9, wherein the detected position of the arm is associated with a position reading made by a position sensor while the cutter bar assembly is positioned against a substantially flat surface.

11. The non-transitory computer readable medium of claim 8, wherein the instructions, when executed by the processor, are configured to cause the processor to receive the input to set the cutter bar assembly of the header in the leveled configuration from a user interface.

12. The non-transitory computer readable medium of claim 8, wherein the control signal instructs the actuator to set a position of the support relative to the pivot joint to match a current base position of the arm with the target leveled base position of the arm.

13. The non-transitory computer readable medium of claim 12, wherein the control signal instructs the actuator to move the support toward the pivot joint to lower the current base position of the arm or to move the support away from the pivot joint to raise the current base position of the arm.

14. The non-transitory computer readable medium of claim 8, wherein the arm is a first arm, and the instructions, when executed by the processor, are configured to cause the processor to output an additional control signal to instruct an additional actuator to set an additional support relative to an additional pivot joint based on a position of the support such that an additional target leveled base position of an additional arm is set based on the target leveled base position of the arm.

15. An agricultural system, comprising:
a cutter bar assembly configured to cut crops during operation of the agricultural system;
an arm assembly comprising:
- an arm configured to support a portion of the cutter bar assembly, wherein the arm is configured to rotate about a pivot joint;
- a fluid-filled biasing member comprising a support configured to couple to the arm, wherein the fluid-filled biasing member is configured to impart a torque onto the arm; and
- an actuator comprising a rod configured to couple to the support, wherein the actuator is configured to move the support along the arm relative to the pivot joint to change the torque imparted by the fluid-filled biasing member onto the arm; and a controller communicatively coupled to the arm assembly and configured to:
- determine a target leveled base position of the arm associated with a leveled configuration of the cutter bar assembly;
- determine the cutter bar assembly is to be set in the leveled configuration; and
- output a signal to instruct the actuator to set a position of the support relative to the pivot joint based on the target leveled base position in response to determining the cutter bar assembly is to be set in the leveled configuration.

16. The agricultural system of claim 15, wherein the arm assembly comprises a position sensor configured to determine a current base position of the arm, the position sensor is configured to output sensor feedback indicative of the current base position of the arm, and the controller is configured to output the signal to set the position of the support relative to the pivot joint based on the current base position of the arm.

17. The agricultural system of claim 16, wherein the controller is configured to output the signal to instruct the actuator to set the position of the support relative to the pivot joint such that the current base position of the arm matches with the target leveled base position of the arm.

18. The agricultural system of claim 15, wherein the controller is configured to determine the cutter bar assembly is to be set in the leveled configuration based on a user input, based on received sensor feedback, based on a pre-programmed path of the agricultural system, or any combination thereof.

19. The agricultural system of claim 15, comprising a fluid source fluidly coupled to a container of the fluid-filled biasing member, wherein the controller is configured to:
- receive an input indicative of a target fluid pressure in the container of the fluid-filled biasing member; and
- output an additional signal to cause the fluid source to supply fluid to, receive fluid from, or maintain an amount of fluid in the container based on the input.

20. The agricultural system of claim 19, comprising an additional arm assembly comprising:
- an additional arm configured to support an additional portion of the cutter bar assembly, wherein the additional arm is configured to rotate about an additional pivot joint;
- an additional fluid-filled biasing member comprising an additional support configured to couple to the additional arm, wherein the additional fluid-filled biasing member is configured to impart a torque onto the additional arm; and
- an additional actuator comprising an additional rod configured to couple to the additional support, wherein the additional actuator is configured to move the additional support along the additional arm relative to the additional pivot joint to change the torque imparted by the additional fluid-filled biasing member onto the additional arm;
- wherein the fluid source is coupled to an additional container of the additional fluid-filled biasing member, the controller is configured to output a further signal to instruct the additional actuator to set an additional position of the additional support relative to the additional pivot joint, and the further signal is output independently of the signal such that the controller controls the actuator and the additional actuator independently of one another.

* * * * *